Patented July 1, 1930

1,768,963

UNITED STATES PATENT OFFICE

WILLIAM W. ODELL, OF CHICAGO, ILLINOIS, AND CLIFFORD W. SEIBEL, OF AMARILLO, TEXAS

PROCESS OF MAKING ABSORBENT MATERIALS

No Drawing.   Application filed September 24, 1924.   Serial No. 739,732.

This invention relates to a process for manufacturing solid activated absorbent material and to the material itself and is partly a continuation of our application Serial Number 577,771 filed July 26, 1922, to which specific reference is hereby made.

Briefly stated, this invention covers an improved material (and the process for its manufacture) for absorbing gases, said material being applicable in the refrigeration process.

The objects of this invention are as follows:

(1) To prepare an absorbent material which can be molded into desired shapes and thus made into uniformly sized particles which may be larger and more uniform than can be prepared by the carbonization of cocoanut shell or other materials now used as absorbents.

(2) To prepare an absorbent that will perform the two-fold duty as absorbent and catalyst.

(3) To prepare an absorbent which may be uniform in size and contain catalytic material distributed throughout its mass, uniformly or otherwise.

(4) To prepare an absorbent-catalyzer which will function as a catalyzer in either oxidizing or reducing chemical reactions depending upon the nature of the catalyzing material incorporated in said absorbent-catalyzer.

(5) To prepare a solid absorbent containing a catalyzer which will perform the functions of both an absorbent and a catalyzer.

(6) To prepare a solid absorbent-catalyzer which is capable of absorbing part of a gaseous, liquid or vapor system, having simultaneously catalytic action upon the adsorbed or upon the nonadsorbed material.

(7) To prepare an absorbent, with or without incorporated catalytic materials, in particles of any desired size which will function either as a gas-adsorbent or as a clarifying and bleaching material in the treatment of liquids.

(8) To prepare an absorbent, or combined absorbent-catalyzer, having a predetermined apparent density varying from considerably less than one to more than one, as desired, which is controlled in the process of manufacture.

(9) To prepare an absorbent, or combined absorbent-catalyzer, the hardness, friability and porosity of which may be controlled within certain limits in the process of manufacture.

(10). To prepare an absorbent molded from macerated peat and subsequently carbonized in which there may be incorporated in processing, the fine sizes of cocoanut char or other active material of low value because of its fineness.

Up to the present time the commonly used carbonaceous absorbents, cocoanut char, boneblack, peach-kernel char and the like are in size and shape dependent upon the size and shape of the materials from which they are respectively prepared. Catalyzing materials when used in conjunction with such absorbents can be retained only upon their outer surfaces.

We have found that peat is a very satisfactory base for the manufacture of active absorbents in which may be incorporated various materials which are catalytic to chemical reactions. The adsorbing power and activity of absorbents prepared from peat depend upon and vary according to:

(1) The nature of the peat used.
(2) The ash content of the peat used.
(3) The degree of maceration of the peat prior to its drying and subsequent carbonization.
(4) The rate and temperature of carbonization.
(5) The rate of drying the macerated peat prior to its carbonization.
(6) The atmospheres in which the peat is respectively macerated, dried and carbonized.

Briefly this process consists in selecting a peat of low ash content; washing the peat, when necessary, to decrease the percentage of ash; macerating the wet peat thoroughly in a controlled gaseous atmosphere; incorporating catalyzing materials in the peat mass when so desired; molding the macerated and well-mixed peat mass, under controlled conditions, into shapes suitable for drying; drying the shaped peat under controlled conditions of temperature, pressure, humidity and gaseous atmosphere; carbonizing the dried or partly dried peat shapes at a controlled rate and under controlled temperature conditions in a suitable closed carbonizer which latter is not claimed as a part of this invention; cooling the resulting char with steam or gas or both out of contact with air; crushing the product thus prepared when finer sizes of absorbent material are desired.

It is sometimes found desirable to steam the hot char for the purpose of reducing its apparent specific gravity and increasing its power to adsorb gas. We find that as the steaming of the hot char is prolonged that the apparent specific gravity of the char decreases for a time and in some instances passes through a minimum and then increases somewhat. The power to adsorb gas and to retain adsorbed gas also increases with steaming and passes through a maximum whereupon further steaming decreases this power. It is desirable to use sufficient steam to remove, by the water-gas reaction ($C+H_2O=CO+H_2$) the carbon deposited by the carbonization of the tar liberated during the carbonization of the peat.

When peat fresh from the bog, containing approximately ninety per cent of water is allowed to dry in the atmosphere, very little shrinkage takes place and the resulting product is porous and has a low apparent specific gravity. This product is not strong and upon carbonizing it yields a rather weak char. In order to overcome this deficiency, we have found that by thoroughly macerating the peat wet, a plastic mass is formed which upon drying shrinks to a hard, dense product having a very much smaller volume than the original macerated mass. At atmospheric pressure the density (apparent specific gravity) and hardness of the dried peat is greater as the rate of drying decreases and as the percentage of moisture in the mass as macerated is increased to even more than ninety per cent. Too rapid a rate of drying causes the mass to crack up into small pieces. In order to prepare a dense, hard dried peat having an apparent specific gravity greater than one, and which upon carbonizing will yield a hard char, it is necessary to use moderately thin masses of macerated peat in the drying operation,—not appreciably over one and a half inches thick,—or to slow the rate of drying.

The porosity of the absorbent may be controlled by regulating the pressure—above or below atmospheric—during the drying period and during the subsequent carbonizing period. For a given set of conditions increasing the pressure decreases the rate of evaporation and increases the apparent specific gravity. Employing reduced pressure (negative pressure) during the drying stage the best results are obtained when the maximum reduction in pressure is made after the moisture content of the peat has been lowered to approximately fifty per cent or less. Peat occurs as a fibrous and as an earthy material and the two kinds do not behave identically the same under a given set of conditions; the character of the end product—char—is materially influenced by changes in pressure during both the drying and the carbonizing stages and it is therefore necessary to adjust the conditions to suit any particular peat.

The addition of very small percentages of volatile salts or other volatile products to the mass as macerated tends to increase the porosity of the subsequently carbonized mass. By volatile salts are meant salts which will volatilize completely at the temperature employed during carbonization. Certain resinous substances which do not completely volatilize but which carbonize function in a similar manner.

We have found that some peats, when macerated in an atmosphere of air take up some oxygen—probably by adsorption—from the air and upon drying yield products which are more friable than the product macerated in a neutral or reducing atmosphere. Combustible gas containing hydrogen is a highly satisfactory atmosphere in which to macerate the wet peat and this atmosphere is also suitable for macerating the peat when it contains the added metal salts.

It is not always necessary to heat the dried peat to a high temperature during the carbonizing period but we have found that usually a char made by slowly heating it to a dull red heat and then rapidly heating it to a bright red heat or hotter and subsequently cooling it by the moderate use of steam, or of steam and gas, is superior particularly for the filtration and clarification of liquids and the adsorption of some gases.

As peat is first heated a large percentage of carbon dioxide ($CO_2$) is liberated. This gas in contact with carbonizing peat is deleterious to the production of the best absorbent hence we prefer to use a gas other than carbon dioxide or oxygen as a flushing agent to carry off the carbonization-gases as liberated. Superheated steam is satisfactory for this purpose if its use is not prolonged into the stage of carbonization when high temperatures obtain, because of the water-gas reaction. However when the salts of platinum and certain other metals are added to the peat during maceration in order to produce a combined catalyzer-absorbent it is sometimes found preferable to subsequently carbonize it at lower temperatures and in the atmosphere resulting from the action of heat upon the dried peat. We have found that when the carbonization is so conducted, by the regulation of the carbonizing temperature, the metal salts added are not completely reduced to the metallic state, and a very highly active catalyzer and absorbent can be prepared. The percentage ratio $CO_2$ to $CO$ is high in the gas liberated from peat during its low-temperature carbonization and this is an important factor in the production of highly active catalyzer-absorbents from peat for it tends to prevent the complete reduction of the metal salts to the metallic state at moderately low temperatures.

A high percentage of ash in peat is deleterious to the production of the best quality of absorbent hence when the ash present is unduly high, and when it can be readily lowered by a washing operation, we prefer to carry out this latter step. The means of doing this is not a part of the patent claims and is not new; any suitable means may be used.

Peat is of such a varying character that it is necessary in the processing of the different kinds to adjust the degree of maceration, the pressure and atmosphere of maceration, the moisture content of the peat as macerated, the size of the shapes or molds made from the macerated peat, the atmosphere, temperature, pressure and rate of drying and the temperature, pressure, atmosphere and rate of carbonization of the dried peat. The nature and kind of the salts used in the macerated peat are varied, according to the catalytic effect desired, based upon the known properties of said salts when suitably reduced in a fine state of division.

We do not claim as our own any particular washing apparatus or macerator for treating peat. Maceration however produces a distinctly different result than merely mixing and we claim the employment of a high degree of maceration as a new step in the production of the products described. Maceration such as has been commonly used in the production of peat fuel is not sufficient to produce the dense absorbent usually required. The maceration may be conducted in a shredder with small openings for the discharge of the macerated peat, in a ball mill, in a pug mill and hog, hammer mill or in a combination of such apparatus or the like.

The term "drying" as used in this application does not necessarily mean expelling all of the water from the peat; air-dried peat sometimes called "dried peat" contains approximately twelve to sixteen per cent of moisture when in equilibrium with the atmosphere.

The metal salts used may be salts of platinum, paladium, uranium, tin and many others. The word "salt" is used broadly and includes besides the true salts the oxides and hydroxides of the metals. More than one salt may be used in the preparation of any particular absorbent or catalyzer.

When a cocoanut charcoal, activated carbon and the like are added to the macerated peat, in quantities less than fifty per cent of the dry peat in the macerated mass, and the whole is thoroughly mixed, molded into shapes, dried and carbonized, the resulting char is hard and very active as an absorbent and the pores seem to be smaller than in the product made from the peat alone under the same conditions.

The process variables which, when changed, influence the character and properties of the resulting product, are: the temperature, pressure and atmosphere employed in the various stages, rate of drying, rate of carbonizing, degree of maceration and the quantity and nature of the added substances. We have found that by the proper control of the variable factors that a char is obtainable which can be readily pulverized to an impalpable powder suitable for use as a filler in the rubber industry which may advantageously replace carbon black and zinc oxide in said industry.

It is possible to briquet the fibrous kinds of peat either with or without binder and with or without catalyzing materials by the application of pressure and the use of suitable molds. The briquets thus made are in some instances satisfactory for carbonization and subsequent use as absorbent material or as a combined absorbent-catalyzer. In this manner of producing an absorbent the properties of the finished product are influenced by the moisture content of the peat briquetted, the pressure employed, the quality and percentage of the binder added, the quantity and nature of the salts added prior to briquetting, and upon the carbonizing, cooling and activating (steaming) variables already mentioned.

The word "absorbent", as used in this application, refers to substances capable of adsorbing as well as absorbing other materials.

We do not wish to confine this patent to a material made from macerated peat only but rather to a material made from briquetted fibrous peat as well.

By way of a specific example we desire to show wherein the absorbent-catalyzer prepared as herein described is useful as both an absorbent and a catalyzer simultaneously. When a tin salt is used in the preparation of said absorbent-catalyzer and the carbonization is so conducted as to reduce substantially all of the tin to the metallic state and the resulting product is subsequently employed in an absorbent chamber through which city gas containing benzol, toluol and phenols, is passed, the benzol and toluol are adsorbed (this is sometimes referred to as absorption) and the phenols are reduced by combination with the hydrogen of the gas. The latter reaction may be represented by the following chemical equation:

$$C_6H_5OH + H_2 = C_6H_6 + H_2O.$$

The tin in the absorbent-catalyzer is catalytic to this reaction and it will be noted that as fast as this reaction takes place the benzol formed, or, in the case of higher phenols the reduced acid, is adsorbed. This immediate adsorption of the reduced product permits the catalyzed reaction to take place to greater completion. Similarly, when tar acids are vaporized in a gas containing hydrogen and the whole passed through the absorbent-catalyzer, the acids are reduced and the reduced products are separated from the gas by adsorption and are subsequently liberated by blowing steam through said absorbent-catalyzer whereupon the vaporized reduction products may be separately condensed in a suitable manner.

The unsaturated hydrocarbons in city gas which readily form gums and resins and frequently cause meter-deposit troubles, may be hydrogenated to saturated and stable compounds with the resultant elimination of the gummy deposits.

This material has further two-fold usefulness in the refining of shale oil, petroleum oil, tars, and in gasoline recovery from natural gas etc.

The maceration may be conducted at atmospheric pressure but we have found that when the peat is macerated under reduced pressure, that is, under a partial vacuum, the density of the subsequently dried product is greater than when the peat is macerated at atmospheric pressure. This we believe to be due to the removal of occluded gases in the peat mass. The prepared peat is carbonized preferably out of contact with air.

Because some varieties of peat tend to crack and check into small pieces upon drying and carbonizing, we have found that it is sometimes desirable to add materials to the peat during its preparation prior to carbonization which will retard or eliminate these tendencies. We do not wish to limit ourselves to the use of any particular chemical or substance; the following materials have proven to be satisfactory: powdered anthracite coal, sodium-sulphide, ammonia or ammonium salts, lime, alkalis, resins and resinates of the alkalis, reducing agents, etc.

The material added in this manner may remain in the finished carbonized product, in a modified form, or it may be entirely eliminated by the action of heat during the carbonization period. For example the salts of calcium or iron are not appreciably volatilized by the action of heat during carbonization whereas certain other materials such as salts of mercury may be completely volatilized by the action of heat either during or after the carbonization period. The tensile strength of the product when dried, and when carbonized, is greater as a result of the incorporation of said added materials in the peat mass prior to its drying.

Since the uses for our product are varied and the requirements somewhat different for the different purposes for which it is used, and since the product must be extremely cheap in some instances whereas in others a more costly product may be used, it is difficult to describe in every detail all the modifications of our method of producing an absorbent for particular purposes. This is made more difficult by the fact that the properties of the peats found in various localities are not alike. We desire that our claims be broad enough to include the modifications. A preferred method may be described, with particular reference to the varieties of peat which are more mature than the extremely fibrous variety, as follows: Take moist matured peat containing 60 per cent or more of water and macerate it in a macerator. The peat will form a plastic mass and should contain sufficient water to yield readily to the macerating operation; this amount should be added when necessary. The macerator should preferably be closed during the operation and a combustible gas substantially free from oxygen, or other reducing gas should be passed into the macerating-chamber. After the peat is thus thoroughly macerated a small percentage of ammonia or an ammonium salt is added to the peat and also a small percentage of a resinate of an alkali. Mix these ingredients thoroughly into the peat by a little maceration. Take the macerated mixture from the macerator and mold it into sized shapes not over 1.5 inches in diameter by the application of pressure and then slowly dry the molded shapes in a dryer in a gaseous atmosphere. After the moisture content of the shapes has been reduced to 50 per cent or less the drying may be continued under reduced pressure—pressure less than atmospheric. Now place the dried shapes in a closed carbonizer and carbonize them out of contact with air by slowly heating them; the early stage of heating, below a dull red heat, should be conducted at a slower rate than the subsequent stage. Finally heat the shapes to a bright red heat. Cool the hot shapes by admitting steam, gas or both steam and gas in contact with them.

When a combined absorbent and catalyzer is desired a metal-salt is added to the plastic mass during the macerating-operation. A salt of tin may be used. The metal-salt used is selected with respect to the known catalytic properties of the metals and the reduced metals.

We claim:

1. A process for preparing from peat a solid active absorbent of regular size and shape as desired consisting in, first, thoroughly macerating the wet peat in a reducing gaseous atmosphere in a macerator, the peat as macerated containing more than sixty per cent of water; second, molding the macerated product into shapes and subsequently drying them to a low percentage moisture content and to a smaller volume; and third, carbonizing the shapes thus dried in a suitable carbonizer by heating them out of contact with air and subsequently cooling the resulting char.

2. A process for preparing from peat a solid absorbent-catalyzer of regular size and shape, consisting in, first, thoroughly macerating the wet peat in a reducing gaseous atmosphere in a macerator, the peat as macerated containing more than sixty per cent of water, and incorporating in the peat in the macerator a very small percentage of a readily reducible metal salt prior to completing the maceration; second, molding the macerated product thus produced into shapes and subsequently drying said shapes to a low percentage moisture content and to a relatively smaller volume, and third, carbonizing the shapes thus dried, in a suitable carbonizer, by heating them out of contact with air until the metal salt is chemically reduced and subsequently cooling the carbonized product.

3. A process for preparing from peat a solid absorbent-catalyzer having a predetermined substantially definite shape, size, porosity and apparent density which vary under control as the process variables are changed consisting in, first, macerating wet peat in a gaseous atmosphere in a macerator forming a plastic mass, uniformly incorporating in said macerated peat during maceration a small percentage of a metal salt; and second, molding the product thus obtained into sized shapes, drying the molded product in a gaseous atmosphere under pressure less than atmospheric, said pressure being lower in the latter stage of drying than in the earlier stage; and third, carbonizing it in a suitable closed carbonizer by heating it, and subsequently cooling the carbonized product.

4. A process for preparing from peat a solid absorbent having a predetermined, substantially definite, shape, size, porosity and apparent specific gravity, which vary under control as the process variables are changed, consisting in, first, macerating wet peat in a gaseous atmosphere having a lower oxygen content than air in a macerator forming a plastic mass; second, molding the macerated peat into sized shapes and drying the molded product in a gaseous atmosphere in a dryer; and third, carbonizing the product thus dried, in a closed carbonizer, by heating it, the rate of heating during the early stage of carbonizing being slower than the rate of heating during the later stage, the product being heated in the last stage to a bright red heat and subsequently cooling the carbonized product out of contact with air.

5. A process for preparing from peat a solid absorbent-catalyzer having a predetermined, substantially definite, shape, size and apparent specific gravity, which vary under control as the process variables are changed, consisting in, first, thoroughly macerating wet peat in a gaseous atmosphere having a lower oxygen content than air in a suitable macerator forming a plastic mass and uniformly incorporating in said plastic mass during maceration a small percentage of a readily reducible metal salt; second, molding the product thus obtained into sized shapes and drying the molded product in a gaseous atmosphere in a dryer; and third, carbonizing the product thus dried in a carbonizer by the application of heat, the rate of heating during the early stage of carbonization being slower than the rate of heating during the later stage, the product being heated in the last stage to a bright red heat and subsequently cooling the carbonized product.

6. A process for preparing from peat an absorbent and catalyzer having predetermined, definite shape and size, consisting in, thoroughly macerating wet peat in a macerator forming a plastic mass, forming the macerated peat into shapes, drying the shapes preferably at a slow rate and subsequently carbonizing the dried shapes in a carbonizer by causing them to be heated preferably at a slow rate to a temperature at which steam will react chemically with the carbon deposited by the carbonization of the tar liberated during the carbonizing stage, and finally cooling the carbonized product employing sufficient steam during said cooling and prior thereto to remove the deposited carbon by chemical reaction with said steam.

7. A process for preparing from peat an absorbent and catalyzer, having predetermined, definite shape and size, consisting in, macerating wet peat in a macerator forming a plastic mass, forming the macerated peat into shapes, drying the shapes preferably at a slow rate and subsequently carbonizing the dried shapes in a carbonizer by causing them to be heated preferably at a slow rate to substantially a bright red heat, flushing the distillation gases out of the carbonizer during the early stage of carbonization by passing gas, other than carbon dioxide and oxygen, through it in contact with said shapes and finally cooling the carbonized product by passing steam through the mass of carbonized shapes out of contact with air.

8. A process for making an active absorbent from peat consisting in thoroughly macerating wet peat in a macerator and incorporating in said macerated peat small percentage amounts of a suitably ground absorbent, such as activated carbon, a resin, a volatile salt, and a metal-salt, forming the mixture into shapes, drying them preferably at a slow rate, carbonizing them, after drying, in a carbonizer, by heating them, and subsequently cooling the carbonized shapes out of contact with air.

9. A process for making an activated absorbent substantially from peat, consisting in, first, macerating a wet mass of material in a partial vacuum with a volatile salt and a resin, the constituents of said material when dry comprising more than fifty per cent of peat; and second, molding, drying and carbonizing the macerated product, and subsequently cooling it.

10. A process for making an absorbent-catalyzer substantially from peat, consisting in first macerating a wet mass of material in a partial vauum, said material when dry consisting of more than fifty per cent of peat mixed with readily reducible metal compounds which, upon heating, become catalytic to chemical reactions, second, molding, drying and carbonizing the macerated product, and subsequently cooling it.

11. A process for making an absorbent-catalyzer substantially from peat, consisting in macerating wet peat in a gaseous atmosphere in a macerator forming a plastic mass, uniformly incorporating in said mass small percentage amounts of a resin, an ammonium compound and a readily-reduced metal compound, molding the resulting mixture into shapes, drying the product thus made in a gaseous atmosphere, carbonizing the dried product in a carbonizer by heating it, and subsequently cooling the carbonized product.

In testimony whereof we affix our signatures.

WILLIAM W. ODELL.
CLIFFORD W. SEIBEL.